same to the spindle of a horizontal milling machine and the other provided with means for the connection of the same to the spindle of a vertical milling machine, one of said sections being provided with a tool, and means for holding said sections together.

2. A device of the class described comprising sections detachably connected with each other, one of the sections being provided with means for its connection with the spindle of a vertical milling machine and the other section being provided with means for the connection with the spindle of a horizontal milling machine, and a marking tool carried directly by one of the sections.

3. A device of the class described having a section in the form of a ring to fit over the spindle of a horizontal milling machine, and a section detachably connected to said ring and provided with a stud to enter the collet of the spindle of a vertical milling machine, one of the sections directly carrying a tool.

4. A device of the class described having a section comprising a ring to fit over the spindle of a horizontal milling machine, a second section comprising a disk fitted against the ring and provided with a boss approximately snugly disposed in said ring, the disk being provided with a stud to enter the collet of the spindle of a vertical milling machine and one of the sections directly carrying a tool and means for detachably connecting the sections with each other.

5. A device of the class described comprising two detachably connected sections, one of which is shaped to embrace the spindle of a horizontal milling machine and the other of which is provided with a stud to enter the collet of a vertical milling machine, one of the sections directly carrying a tool.

In testimony whereof I affix my signature in presence of two witnesses.

HAROLD S. FORSBERG.

Witnesses:
  THEODORE R. SEHL,
  ALVIN MULLIN.

Copies of this patent may be obtained for five cents each, by addressing the "Commissioner of Patents, Washington, D. C."

C. F. GEERTZ.
MAIL HANDLING DEVICE.
APPLICATION FILED MAR. 25, 1916.
1,188,643.
Patented June 27, 1916.
2 SHEETS—SHEET 1.
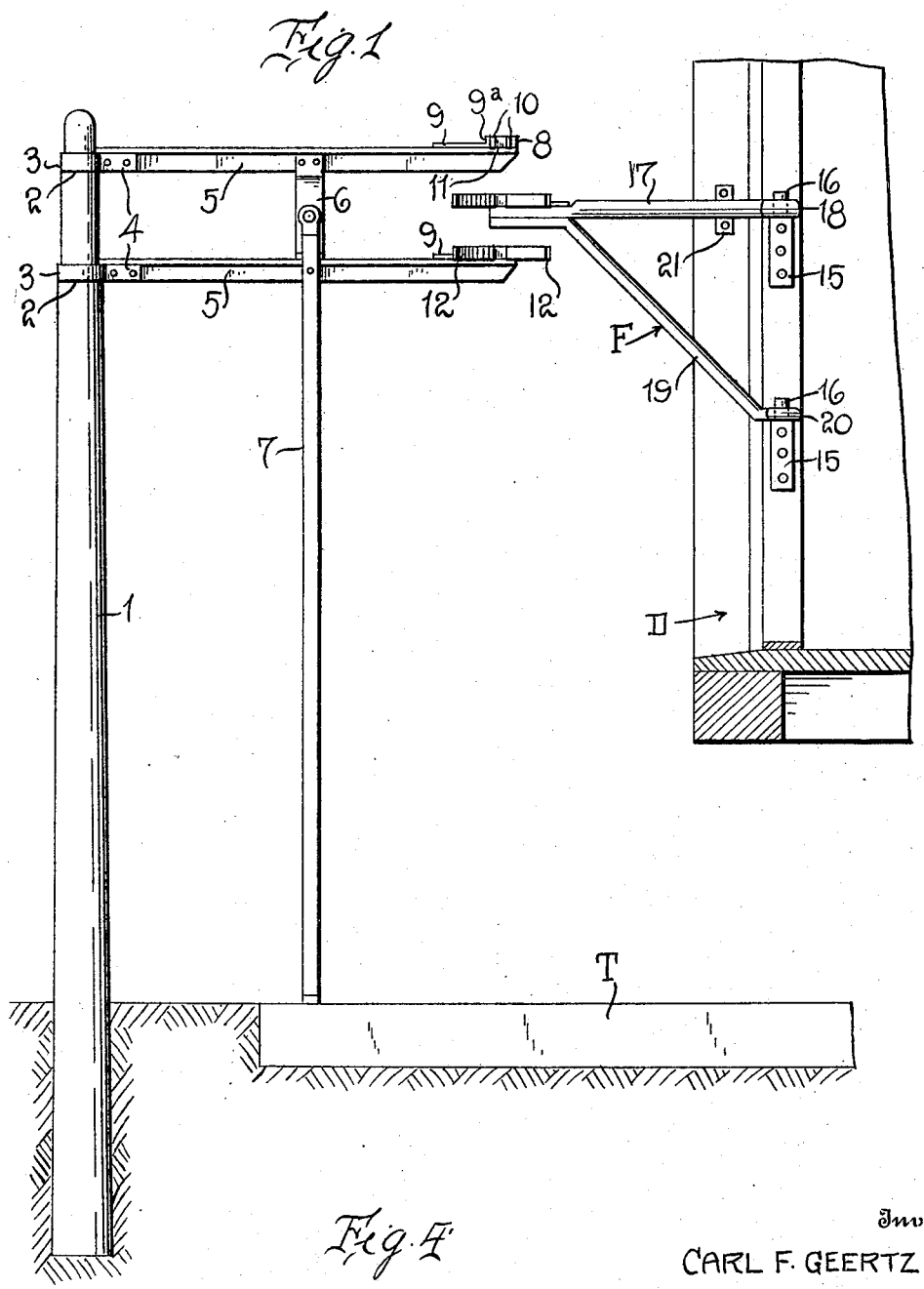
Inventor
CARL F. GEERTZ
By Watson E. Coleman
Attorney C. F. GEERTZ.
MAIL HANDLING DEVICE.
APPLICATION FILED MAR. 25, 1916.
1,188,643.
Patented June 27, 1916.
2 SHEETS—SHEET 2.
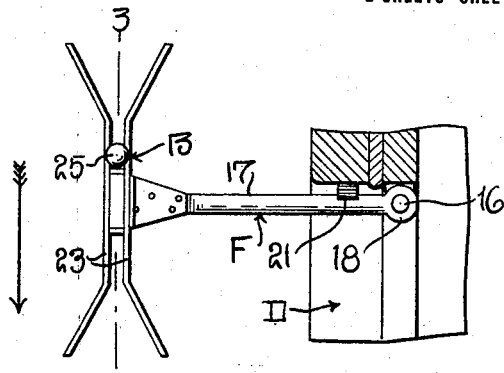
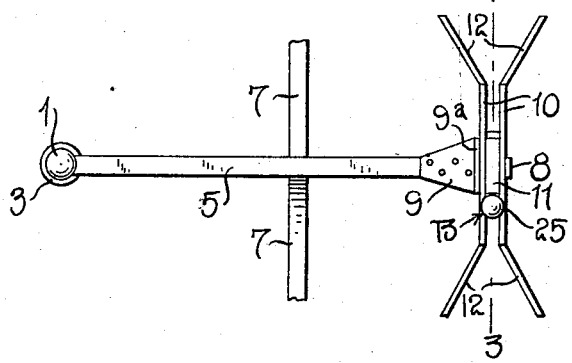
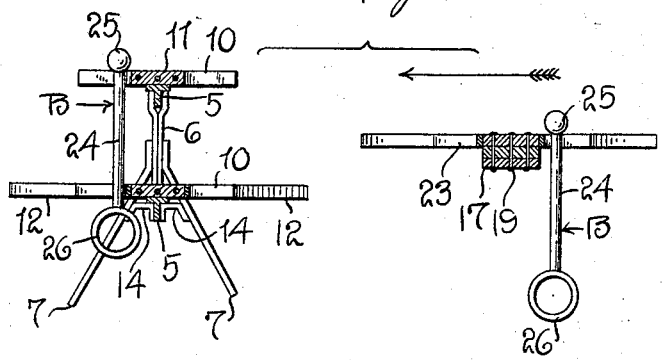
Inventor
CARL F. GEERTZ
By Watson E. Coleman
Attorney